(12) United States Patent
Ii et al.

(10) Patent No.: US 7,130,776 B2
(45) Date of Patent: Oct. 31, 2006

(54) METHOD AND COMPUTER PROGRAM PRODUCT FOR PRODUCING A PATTERN RECOGNITION TRAINING SET

(75) Inventors: David L. Ii, Owego, NY (US); Elliott D. Reitz, II, Endicott, NY (US); Dennis A. Tillotson, Cortland, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 755 days.

(21) Appl. No.: 10/105,714

(22) Filed: Mar. 25, 2002

(65) Prior Publication Data

US 2004/0015464 A1 Jan. 22, 2004

(51) Int. Cl.
G06F 17/50 (2006.01)
G06F 15/18 (2006.01)
G06K 9/46 (2006.01)

(52) U.S. Cl. .................... 703/2; 703/22; 382/190; 382/228; 706/15

(58) Field of Classification Search ............ 703/2, 703/17, 22; 382/159, 228, 190; 704/233, 704/226; 706/20–45, 15
See application file for complete search history.

(56) References Cited

U.S. PATENT DOCUMENTS

| | | | |
|---|---|---|---|
| 3,484,746 A | 12/1969 | Fralick et al. | |
| 4,874,963 A * | 10/1989 | Alspector | 706/34 |
| 5,107,442 A | 4/1992 | Weideman | |
| 5,226,092 A | 7/1993 | Chen | |
| 5,283,838 A | 2/1994 | Togawa et al. | |
| 5,313,558 A * | 5/1994 | Adams | 706/20 |
| 5,359,699 A | 10/1994 | Tong et al. | |
| 5,390,285 A | 2/1995 | Wood | |
| 5,444,796 A | 8/1995 | Ornstein | |
| 5,553,156 A | 9/1996 | Obata et al. | |
| 5,590,218 A | 12/1996 | Ornstein | |
| 5,751,910 A | 5/1998 | Bryant et al. | |
| 5,754,681 A * | 5/1998 | Watanabe et al. | 382/159 |
| 5,768,422 A | 6/1998 | Yaeger | |
| 5,805,730 A | 9/1998 | Yaeger et al. | |
| 5,805,731 A | 9/1998 | Yaeger et al. | |
| 5,822,742 A * | 10/1998 | Alkon et al. | 706/31 |
| 5,835,633 A | 11/1998 | Fujisaki et al. | |
| 5,903,884 A | 5/1999 | Lyon et al. | |
| 6,301,571 B1 * | 10/2001 | Tatsuoka | 706/45 |
| 6,535,641 B1 * | 3/2003 | Baggenstoss | 382/228 |
| 6,650,779 B1 * | 11/2003 | Vachtesvanos et al. | 382/228 |
| 6,876,966 B1 * | 4/2005 | Deng et al. | 704/233 |
| 6,910,010 B1 * | 6/2005 | Iwahashi et al. | 704/233 |
| 6,959,276 B1 * | 10/2005 | Droppo et al. | 704/226 |
| 2002/0150302 A1 * | 10/2002 | McCarthy et al. | 382/254 |
| 2004/0015894 A1 * | 1/2004 | Lange | 717/138 |

* cited by examiner

Primary Examiner—Thai Phan
(74) Attorney, Agent, or Firm—Tarolli, Sundheim, Covell&Tummino LLP

(57) ABSTRACT

The present invention recites a method and computer program product for generating a set of training samples from a single ideal pattern for each output class of a pattern recognition classifier. A system equivalent pattern is generated for each of a plurality of classes from a corresponding ideal pattern. A noise model, simulating at least one type of noise expected in a real-world classifier input pattern, is then applied to each system equivalent pattern a set number times to produce, for each output class, a number of training samples. Each training sample simulates defects expected in real-world classifier input patterns.

20 Claims, 3 Drawing Sheets

METHOD AND COMPUTER PROGRAM PRODUCT FOR PRODUCING A PATTERN RECOGNITION TRAINING SET

BACKGROUND OF THE INVENTION

1. Technical Field

The invention relates to a system for providing training samples for a pattern recognition device or classifier. Image processing systems often contain pattern recognition devices (classifiers).

2. Description of the Prior Art

Pattern recognition systems, loosely defined, are systems capable of distinguishing between various classes of real world stimuli according to their divergent characteristics. A number of applications require pattern recognition systems, which allow a system to deal with unrefined data without significant human intervention. By way of example, a pattern recognition system may attempt to classify individual letters to reduce a handwritten document to electronic text. Alternatively, the system may classify spoken utterances to allow verbal commands to be received at a computer console. In order to classify real-world stimuli, however, it is necessary to train the classifier to discriminate between classes by exposing it to a number of sample patterns.

Training a pattern recognition system requires a large number of samples to obtain acceptable accuracy rates. Often, the only difficulty in collecting these samples is one of expense, as examples of the items to be sorted are readily available. In some applications, however, samples will not be available in sufficient number for some or all of the output classes. By way of example, it is sometimes necessary to train the pattern recognition system prospectively to identify samples not yet commonly available. In such cases, it is impossible to obtain the necessary number of samples to properly train a classifier. Often, only a single prototypical sample will be available for each class. It would be desirable to generate a full set of training samples from this limited data.

SUMMARY OF THE INVENTION

The present invention recites a method and computer program product for generating a set of training samples from a single ideal pattern for each output class of a pattern recognition classifier. A system equivalent pattern is generated for each of a plurality of classes from a corresponding ideal pattern. A noise model, simulating at least one type of noise expected in a real-world classifier input pattern, is then applied to each system equivalent pattern a set number times to produce, for each output class, a number of training samples. Each training sample simulates defects expected in real-world classifier input patterns.

In accordance with another aspect of the present invention, a computer program product, operative in a data processing system, is disclosed for generating a set of training samples from a single ideal pattern for each output class of a pattern recognition classifier. A classifier system simulator generates a system equivalent pattern for each of a plurality of classes from a corresponding ideal pattern. A noise model simulates at least one type of noise expected in a real-world classifier input pattern and incorporates the simulated noise into each system equivalent pattern a set number of times to produce, for each output class, a number of training samples. Each training sample simulates defects expected in real-world classifier input patterns.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DETAILED DESCRIPTION OF THE INVENTION

In accordance with the present invention, a method for producing a training set for a pattern recognition classifier using a single ideal pattern from each class is described. The method may be applied to train classifiers used in any traditional pattern recognition classifier task, including, for example, optical character recognition (OCR), speech translation, and image analysis in medical, military, and industrial applications.

It should be noted that the pattern recognition classifier for which sample sets are produced by the present invention will typically be implemented as a computer program, preferably a program simulating, at least in part, the functioning of a neural network. Accordingly, understanding of the present invention will be facilitated by an understanding of the operation and structure of a neural network.

Figure 1:
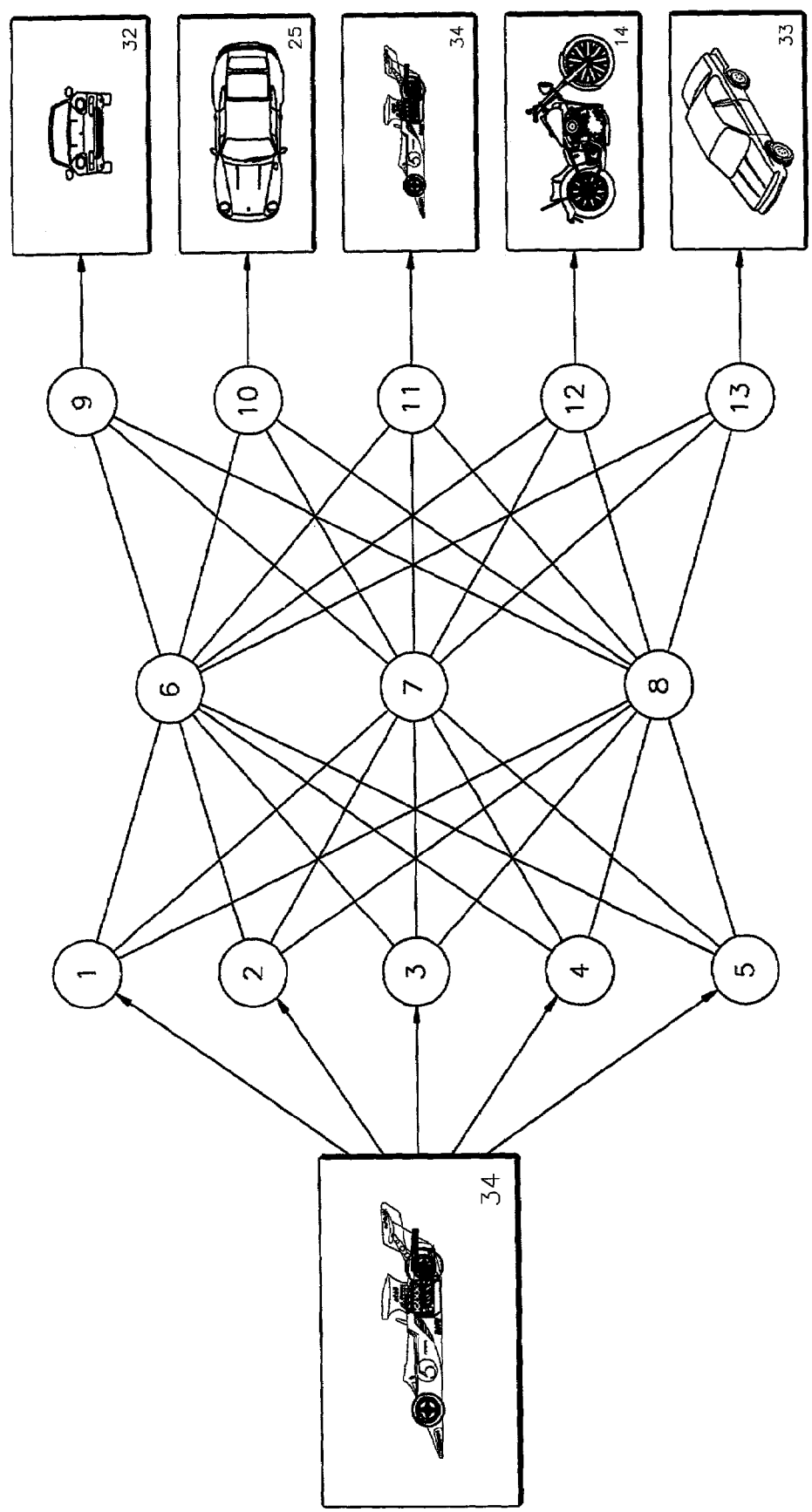
FIG. 1 is an illustration of an exemplary neural network utilized for pattern recognition.

FIG. 1 illustrates a neural network which might be used in a pattern recognition task. The illustrated neural network is a three-layer back-propagation neural network used in a pattern classification system. It should be noted here, that the neural network illustrated in FIG. 1 is a simple example solely for the purposes of illustration. Any non-trivial application involving a neural network, including pattern classification, would require a network with many more nodes in each layer. Also, additional hidden layers might be required.

In the illustrated example, an input layer comprises five input nodes, 1–5. A node, generally speaking, is a processing unit of a neural network. A node may receive multiple inputs from prior layers which it processes according to an internal formula. The output of this processing may be provided to multiple other nodes in subsequent layers. The functioning of nodes within a neural network is designed to mimic the function of neurons within a human brain.

Each of the five input nodes 1–5 receive input signals with values relating to features of an input pattern. By way of example, the signal values could relate to the portion of an image within a particular range of grayscale brightness. Alternatively, the signal values could relate to the average frequency of a audio signal over a particular segment of a recording. Preferably, a large number of input nodes will be used, receiving signal values derived from a variety of pattern features.

Each input node sends a signal to each of three intermediate nodes 6–8 in the hidden layer. The value represented by each signal will be based upon the value of the signal received at the input node. It will be appreciated, of course, that in practice, a classification neural network may have a number of hidden layers, depending on the nature of the classification task.

Each connection between nodes of different layers is characterized by an individual weight. These weights are established during the training of the neural network. The value of the signal provided to the hidden layer by the input nodes is derived by multiplying the value of the original input signal at the input node by the weight of the connection between the input node and the intermediate node. Thus, each intermediate node receives a signal from each of the input nodes, but due to the individualized weight of each connection, each intermediate node receives a signal of different value from each input node. For example, assume that the input signal at node 1 is of a value of 5 and the weight of the connection between node 1 and nodes 6–8 are 0.6, 0.2, and 0.4 respectively. The signals passed from node 1 to the intermediate nodes 6–8 will have values of 3, 1, and 2.

Each intermediate node 6–8 sums the weighted input signals it receives. This input sum may include a constant bias input at each node. The sum of the inputs is provided into an transfer function within the node to compute an output. A number of transfer functions can be used within a neural network of this type. By way of example, a threshold function may be used, where the node outputs a constant value when the summed inputs exceed a predetermined threshold. Alternatively, a linear or sigmoidal function may be used, passing the summed input signals or a sigmoidal transform of the value of the input sum to the nodes of the next layer.

Regardless of the transfer function used, the intermediate nodes 6–8 pass a signal with the computed output value to each of the nodes 9–13 of the output layer. An individual intermediate node (i.e. 7) will send the same output signal to each of the output nodes 9–13, but like the input values described above, the output signal value will be weighted differently at each individual connection. The weighted output signals from the intermediate nodes are summed to produce an output signal. Again, this sum may include a constant bias input.

Each output node represents an output class of the classifier. The value of the output signal produced at each output node represents the probability that a given input sample belongs to the associated class. In the example system, the class with the highest associated probability is selected, so long as the probability exceeds a predetermined threshold value. The value represented by the output signal is retained as a confidence value of the classification.

Figure 2:
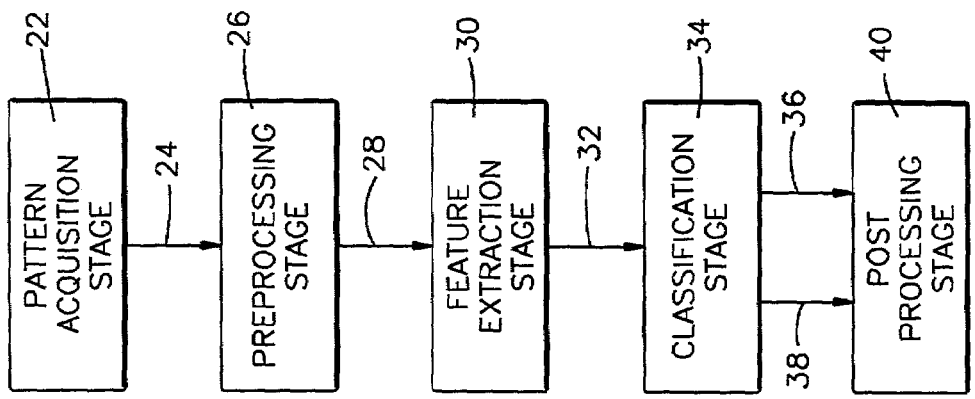
FIG. 2 is a functional diagram of a classifier compatible with the present invention.

FIG. 2 illustrates a classification system 20 which might be used in association with the present invention. As stated above, the system is usually implemented as a software program. Therefore, the structures described herein may be considered to refer to individual modules and tasks within that program.

Focusing on the function of a classification system 20 compatible with the present invention, the classification process begins at a pattern acquisition stage 22 with the acquisition of an input pattern. The pattern 24 is then sent to a preprocessing stage 26, where the pattern 24 is preprocessed to enhance the image, locate portions of interest, eliminate obvious noise, and otherwise prepare the pattern for further processing.

The selected portions of the pattern 28 are then sent to a feature extraction stage 30. Feature extraction converts the pattern 28 into a vector 32 of numerical measurements, referred to as feature variables. Thus, the feature vector 32 represents the pattern 28 in a compact form. The vector 32 is formed from a sequence of measurements performed on the pattern. Many feature types exist and are selected based on the characteristics of the recognition problem.

The extracted feature vector 32 is then provided to a classification stage 34. The classification stage 34 relates the feature vector 32 to the most likely output class, and determines a confidence value 36 that the pattern is a member of the selected class. This is accomplished by a statistical or neural network classifier. Mathematical classification techniques convert the feature vector input to a recognition result 38 and an associated confidence value 36. The confidence value 36 provides an external ability to assess the correctness of the classification. For example, a classifier output may have a value between zero and one, with one representing maximum certainty.

Finally, the recognition result 38 is sent to a post-processing stage 40. The post-processing stage 30 applies the recognition result 38 provided by the classification stage 34 to a real-world problem. By way of example, in a stamp recognition system, the post-processing stage might keep track of the revenue total from the classified stamps.

Figure 3:
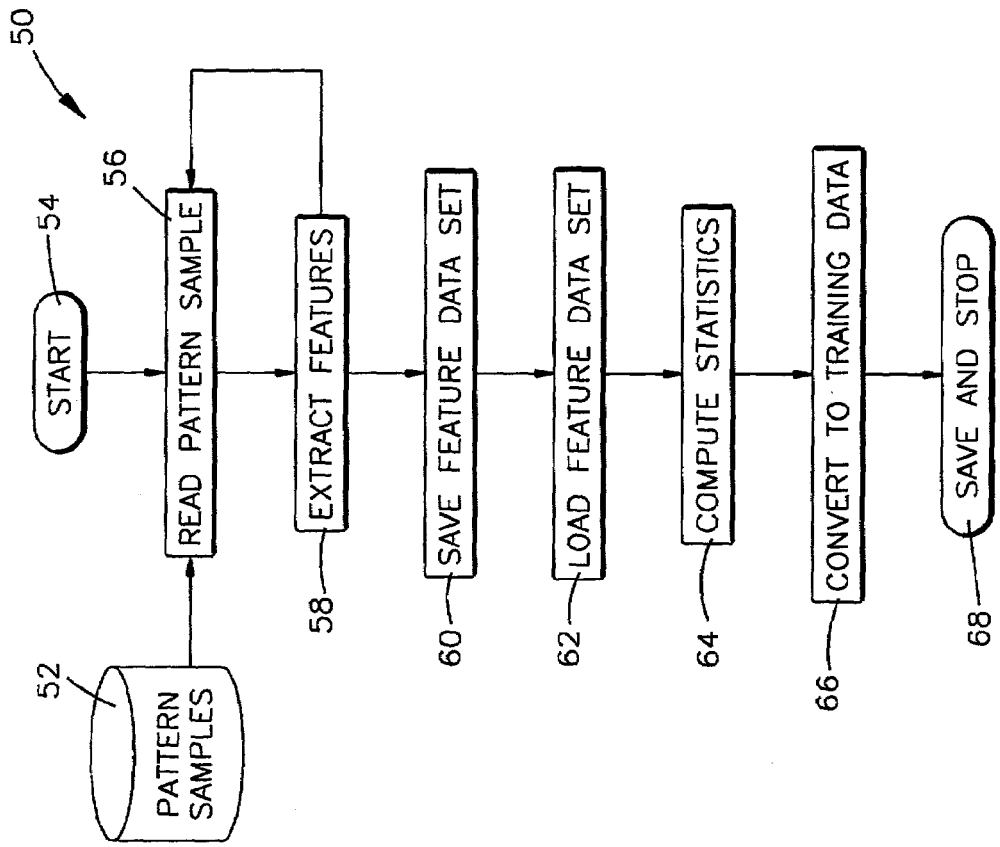
FIG. 3 is a flow diagram illustrating the training of a classifier compatible with the present invention.

FIG. 3 is a flow diagram illustrating the operation of a computer program 50 used to train a pattern recognition classifier via computer software. A number of pattern samples 52 are created in accordance with the present invention. The number of pattern samples necessary for training varies with the application. The number of output classes, the selected features, and the nature of the classification technique used directly affect the number of samples needed for good results for a particular classification system. While the present invention allows a large number of samples to be generated, too many samples can be problematic, as it can take too long to process the training data without a significant gain in performance.

The actual training process begins at step 54 and proceeds to step 56. At step 56, the program retrieves a pattern sample from memory. The process then proceeds to step 58, where the pattern sample is converted into a feature vector input similar to those a classifier would see in normal run-time operation. After each sample feature vector is extracted, the results are stored in memory, and the process returns to step 56. After all of the samples are analyzed, the process proceeds to step 60, where the feature vectors are saved to memory as a set.

The actual computation of the training data begins in step 62, where the saved feature vector set is loaded from memory. After retrieving the feature vector set, the process progresses to step 64. At step 64, the program calculates statistics, such as the mean and standard deviation of the feature variables for each class. Intervariable statistics may also be calculated, including a covariance matrix of the sample set for each class. The process then advances to step 66 where it uses the set of feature vectors to compute the training data. At this step in the example embodiment, an inverse covariance matrix is calculated, as well as any fixed value terms needed for the classification process. After these calculations are performed, the process proceeds to step 68 where the training parameters are stored in memory and the training process ends.

Figure 4:
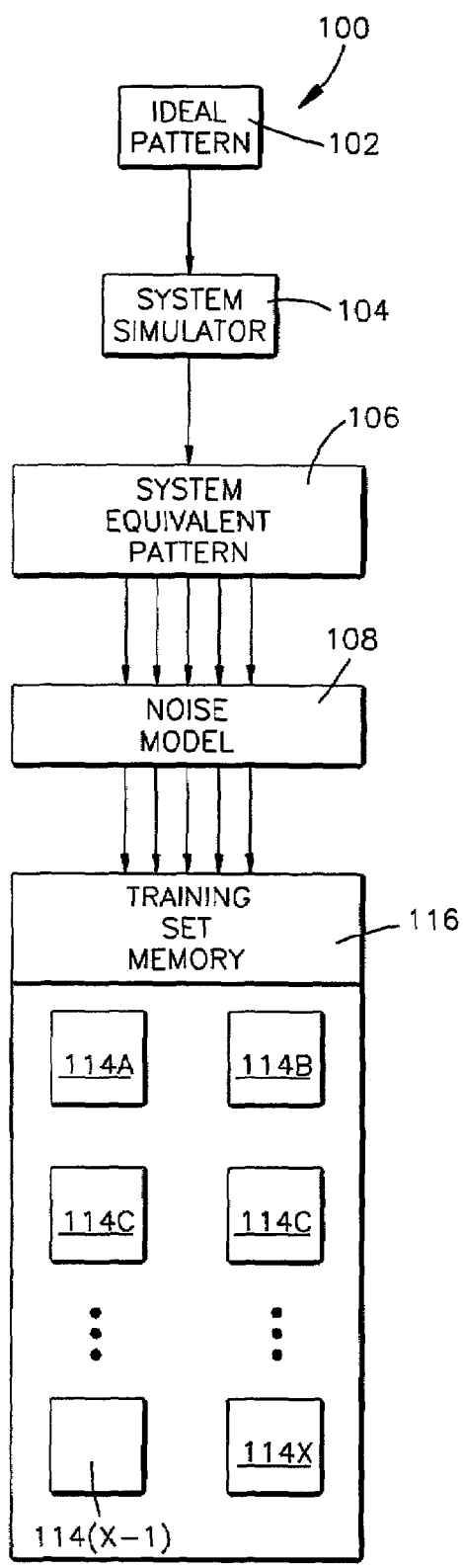
FIG. 4 is a schematic diagram the present invention.

FIG. 4 illustrates a system 100 for the production of a training set of X samples for one output class of a pattern recognition classifier from a single ideal pattern 102. The process begins with the selection of an ideal pattern 102. This ideal pattern 102 is reduced to a system equivalent form (i.e. an identical pattern in a form recognizable to an associated classifier) in a classifier system simulator 104.

This reduction can take a number of forms. In a speech recognition system, this could involve making a recording of a audio sample and digitizing it. In an image recognition system, this would include scanning the image to a digital form and enhancing the image for analysis.

The system equivalent pattern 106 produced at the system simulator 104 should be an ideal representative of its associated output class. As a result, the system equivalent patterns 106 should be either checked against expected parameters for their respective class or verified via human judgment. In an example embodiment of producing a training set for a stamp recognition system, the system equivalent image is obtained via high-resolution digital color scanning of a stamp representing an associated output class.

Within the system simulator 104, the acquired pattern is preprocessed to create an image recognizable to the associated classifier. An image sample, for example, might be filtered and reduced to a grayscale representation. Other patterns will undergo analogous processes to facilitate later analysis. In the example embodiment of a stamp recognition system, the stamp image may be either reduced to a grayscale representation or further reduced to a binary representation. A scanned image consists of a number of discrete points known as pixels. In a binary representation, each individual pixel is given values of 0 or 1 based upon its grayscale value. Pixels with a grayscale value exceeding a predetermined threshold are assigned a value of 1, while pixels with a grayscale value falling below the threshold are assigned a value of 0.

The system equivalent pattern 106 is then inputted into a noise model 108. The noise model 108 simulates at least one type of noise expected from real-world inputs. In most applications, there will be a plurality of known noise types to apply to the system equivalent pattern 106. The noise model 108 generates random parameters defining the location and amount of each type of noise and generates a copy of the system equivalent pattern 106 containing this noise. Put simply, the noise model uses the system equivalent pattern 106 as a base to produce training samples 114A–114X incorporating random noise. In the preferred embodiment, all known noise types are used in each training sample. It is possible, however, to use a subset of the known noise types in producing each training sample. In such a case, the noise types used for each individual training sample may be preselected by the operator or randomly selected by the system.

The noise model 108 is applied to the system equivalent sample 106 multiple times to produce a number of samples 114A–114X. This process is not iterative; the unaltered system equivalent pattern 106 is used as a base for each application of the noise model 108. The number of desired samples will vary among, and possibly within, applications. While practical limits exist for a particular application according to the number of useful noise types and the digital storage space required for the pattern, the present invention can generate a sufficient number of distinct training samples for virtually any application. In the example embodiment, over 200 training samples may be generated for an output class from a single ideal sample.

Since the location and amount of each type of noise is determined randomly, it is unlikely that any two training samples will appear exactly the same, even when the same noise types are applied to each sample. By way of example, when the input pattern is a scanned image, a noise type that may be applied to the image is a "1-D cutting", representing the loss of a section of the image on one side. A number of applications of the "1-D cutting" noise type might result in images varying from an image missing one or more pixel columns on its right side to an image missing a substantial portion of its left half. Other noise types that may be applied to an image, such as simulated cuts, tears, and patches of altered brightness allow greater variety in the random generation of location and can appear anywhere on the scanned image.

A noise model 108 simulates noise types modeled on expected real world defects in classifier input patterns. Accordingly, the random generation of each type of noise is governed by parameters chosen to simulate the expected occurrence of that particular type of noise. Often, knowledge of similar output classes will be available in determining noise parameters for the new class. Using, for illustration, the previous example of creating samples to train a stamp recognition system, if it is known that inputted stamps generally exhibit a rotation of no more than 15°, in generating samples for a new class of stamps, rotations greater than 15° will be rare. Other examples will be apparent to one skilled in the art.

One consequence of the simulation of real world inputs is that, in a typical application, not every noise type will appear in each training sample. Few real world inputs will contain significant amounts of every conceivable type of noise, thus a condition of zero noise will be in the range of allowable noise amounts for most noise types within the noise model. Accordingly, even when all noise types are used, often some training samples will be contain no noise from one or more noise types.

A variety of noise types have been identified for use in the example embodiment. These include defects that can occur upon the image itself, as well as defects which can occur as part of the scanning process during classification. Defects occurring within the stamp include tears, folds, and cuts, vertical and horizontal stretching, and rotation on the field of the scanned envelope. These defects can be simulated by deleting and repositioning pixels within the system equivalent image. Defects that can occur during scanning include a "salt and pepper" (i.e. randomly occurring patches of lightened and darkened regions) and "speckle" (i.e. occurrence of dark spots throughout image) patterns, global distortion of the brightness of the image, and ordinary Gaussian noise, all of which can be simulated by altering the grayscale value of individual pixels within the system equivalent image. This list is not intended to be exhaustive; further potential defects for the given example as well as analogous defects for other applications should be apparent to one skilled in the art.

Some interaction will exist between the noise types due to their similar natures. The brightness of an individual pixel can be affected by global distortion, the salt and pepper pattern, and by Gaussian noise. A pixel affected by all three of these noise types will show a change in brightness that is not associated with any one noise type. Accordingly, the interaction between the noise types can lead to pattern noise that is not explicitly included in the known noise types. This has the effect of increasing the diversity of training samples. Not all of the noise types interact in this manner. Simulated tears and folds, for example, would not be affected by other image changes, as they are intended to represent a region of missing image in the original stamp. Accordingly, applying additional noise to this region is unnecessary.

After each training sample (e.g. 114A) is produced, it is stored in a training set memory 116 as part of the training set for its associated class. When the desired number of samples (e.g., 114A) has been produced, the set is closed and encoded in a form convenient for use by the associated classifier.

Figure 5:
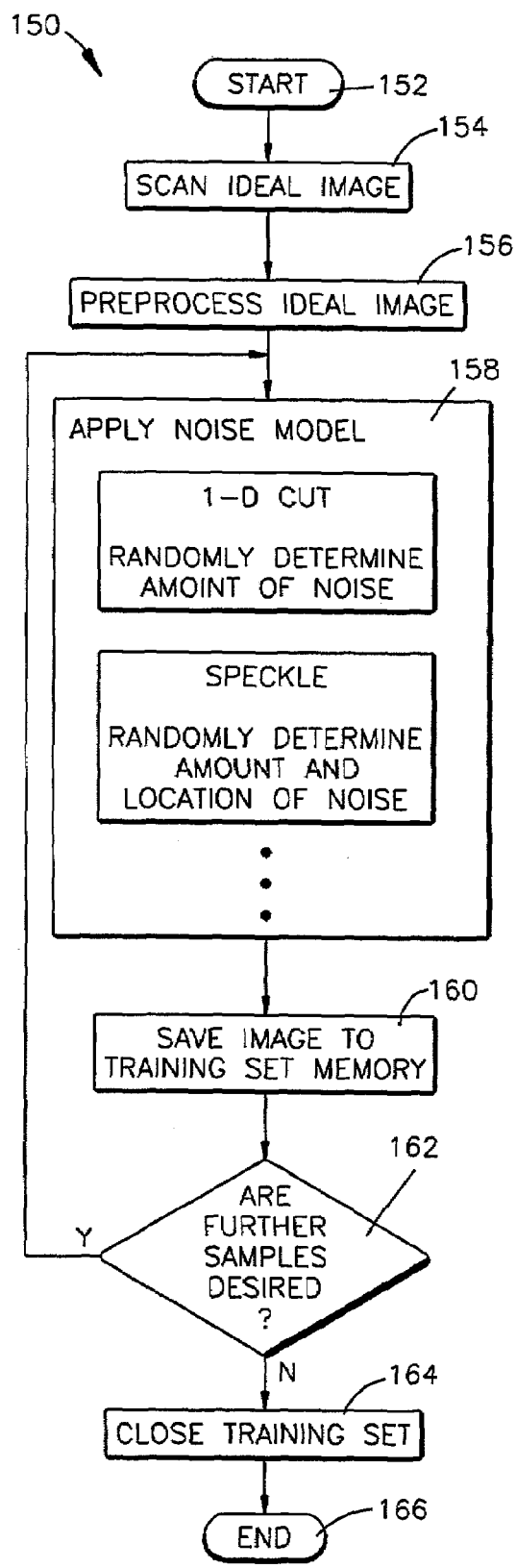
FIG. 5 is a flow diagram illustrating the run-time operation of the present invention in the context of a stamp recognition system.

FIG. 5 is a flow diagram illustrating the operation of the present invention in the context of generating samples for an example embodiment of a stamp recognition system. The process 150 begins at step 152. The process then advances to step 154, where an ideal stamp image for a selected output class is scanned into the system. The program then progresses to step 156, where the scanned image is preprocessed to create a system equivalent image for the associated classifier. Generally, the image will be normalized and filtered, and grayscale and binary representations will be created to simplify processing. The process then advances to step 158.

At step 158, the noise model randomly determines the amount and location within each type of noise to be applied to the system equivalent image. In the example embodiment, the noise model is capable of simulating multiple noise types, including the speckled, 1-D cutting, and Gaussian noise types discussed above. The program will randomly determine the location and amount of simulated noise for each noise type prior to application to a base image. Each noise type is then applied to the system equivalent image to incorporate the previously determined noise into the image. The addition of the noise to the system equivalent image produces a training sample for the associated classifier. The process then advances to step 160, where the newly created training sample is saved to a training set memory.

The process then advances to step 162, where the system checks to see if the desired number of image samples has been generated. If not, the process returns to step 158, to reapply the noise model to the system equivalent image. If no more samples are desired, the process proceeds to step 164, where the image training set is closed. The process terminates at step 166.

It will be understood that the above description of the present invention is susceptible to various modifications, changes and adaptations, and the same are intended to be comprehended within the meaning and range of equivalents of the appended claims. The presently disclosed embodiments are considered in all respects to be illustrative, and not restrictive. The scope of the invention is indicated by the appended claims, rather than the foregoing description, and all changes that come within the meaning and range of equivalence thereof are intended to be embraced therein.

Having described the invention, we claim:

1. A method for generating a set of X training samples from a single ideal pattern for each output class of a pattern recognition classifier, comprising:
    generating a system equivalent pattern for each of a plurality of classes from a corresponding ideal pattern; and
    applying a noise model, simulating a plurality of noise types expected in a real-world classifier input pattern, where each of the plurality of noise types are defined by at least one of a plurality of parameters associated with the noise model, to each system equivalent pattern X times to produce, for each output class, X training samples, each simulating defects expected in real-world classifier input patterns.

2. A method as set forth in claim 1, wherein the plurality of parameters associated with the noise model are selected randomly.

3. A method as set forth in claim 1, wherein the system equivalent pattern for each class is a scanned image.

4. A method as set forth in claim 3, wherein the system equivalent pattern for each claus is a scanned image of an alphanumeric character.

5. A method as set forth in claim 3, wherein the system equivalent pattern for each class is the scanned image of a postage stamp.

6. A method as set forth in claim 3, wherein one of the plurality of known noise types simulates a horizontal stretching of the scanned image.

7. A method as set forth in claim 3, wherein one of the plurality of known noise types simulates Gaussian noise within the scanned image.

8. A method as set forth in claim 3, wherein one of the plurality of known noise types simulates a clipping of one side of the scanned image.

9. A computer program product, operative in a data processing system and implemented on a computer readable medium, for generating a set of X training images from a single ideal image for each output class of a pattern recognition classifier, comprising:
    a classifier system simulator that generates a system equivalent image for each of a plurality of classes from a corresponding ideal image; and
    a noise model, having a plurality of associated parameters, that simulates a plurality of noise types expected in a real-world classifier input image and incorporates the simulated noise into each system equivalent image X times to produce, for each output class, X training images, each training image simulating defects expected in real-world classifier input images.

10. A computer program product as set forth in claim 9, wherein plurality of parameters associated with the noise model is selected randomly.

11. A computer program product as set forth in claim 9, wherein the system equivalent image for each class is a scanned image of an alphanumeric character.

12. A computer program product as set forth in claim 9, wherein the system equivalent image for each class is the scanned image of a postage stamp.

13. A computer program product as set forth in claim 9, wherein one of the plurality of known noise types simulates a rotation of the scanned image.

14. A computer program product as set forth in claim 9, wherein one of the plurality of known noise types simulates distortion of the brightness of the scanned image.

15. A computer program product as set forth in claim 9, wherein one of the plurality of known noise types simulates a tear or cut within the source of the scanned image.

16. A method for training a pattern recognition classifier, comprising:
    generating a system equivalent pattern fur each of a plurality of output classes from a corresponding ideal pattern;
    generating a plurality of instances of a noise model for each of the system equivalent patterns, a given instance of the noise model simulating a plurality of noise types, where associated characteristics of each of the plurality of noise types are defined by a set of at least one parameter from a plurality of parameters comprising the noise model;
    applying each instance of the noise model to the system equivalent pattern to generate a plurality of training samples for each of the plurality of output classes; and
    training the pattern recognition classifier on the plurality of training samples generated for each of the plurality of output classes.

17. The method of claim 16, wherein the step of generating a plurality of instances of a noise model comprises, for a given instance, the step of setting the set of at least one parameter to associated null values for a selected set of at least one of the plurality of noise types such that the selected set of at least one noise type is not represented in the instance.

18. The method of claim 16, wherein the step of generating a plurality of instances of a noise model comprises, for a given instance, the step of randomly generating the at least one parameter associated with at least one of the plurality of noise types.

19. The method of claim 16, wherein the step of generating a plurality of instances of a noise model comprises, for a given instance, the step of accepting the sets of at least one parameter associated with the plurality of noise types as submitted by a human operator.

20. The method of claim 19, wherein the step of generating a plurality of instances of a noise mode comprises, for a given instance, the step of selecting the sets of at least one parameter associated with the plurality of noise types to produce an interaction between at least two of the plurality of noise types, such that the interaction between the noise types produces within the training sample associated with the instance a noise type that is not explicitly included in the plurality of noise types comprising the noise model.

* * * * *